(12) United States Patent
Yelistratov et al.

(10) Patent No.: US 8,991,029 B2
(45) Date of Patent: Mar. 31, 2015

(54) BEAM STRUCTURE

(75) Inventors: Alexei P. Yelistratov, Dunlap, IL (US); James A. Forck, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 763 days.

(21) Appl. No.: 13/245,241

(22) Filed: Sep. 26, 2011

(65) Prior Publication Data

US 2013/0078072 A1    Mar. 28, 2013

(51) Int. Cl.
  *E02F 9/14* (2006.01)
  *E02F 3/38* (2006.01)
  *E04C 3/06* (2006.01)
  *E02F 3/42* (2006.01)
  *E04C 3/04* (2006.01)

(52) U.S. Cl.
  CPC ... *E02F 3/38* (2013.01); *E04C 3/06* (2013.01); *E04C 2003/0465* (2013.01); *E04C 2003/0413* (2013.01); *E02F 3/425* (2013.01)
  USPC ............... 29/462; 29/463; 212/177; 212/347; 414/722; 414/727; 52/116

(58) Field of Classification Search
  CPC ............... E02F 3/38; E04C 2003/0413; E04C 2004/043; E04C 2003/0465; E04C 3/06
  USPC ............. 414/722, 727; 212/177, 347; 29/462, 29/463

See application file for complete search history.

(56) References Cited

U.S. PATENT DOCUMENTS

| | | | |
|---|---|---|---|
| 2,610,754 A * | 9/1952 | Inskeep | 414/727 |
| 7,156,422 B2 | 1/2007 | Verhaeghe | |
| 2002/0085905 A1 | 7/2002 | Schupback | |
| 2005/0011604 A1 * | 1/2005 | Anderson et al. | 156/173 |
| 2006/0103099 A1 | 5/2006 | Zuber | |
| 2008/0187427 A1 * | 8/2008 | Durney | 414/722 |
| 2008/0292443 A1 * | 11/2008 | Nose et al. | 414/722 |
| 2011/0068076 A1 * | 3/2011 | Schmidt et al. | 212/276 |
| 2011/0097598 A1 * | 4/2011 | McNutt et al. | 428/650 |

* cited by examiner

*Primary Examiner* — Scott Lowe

(74) *Attorney, Agent, or Firm* — Bart A. Fisher

(57) ABSTRACT

A beam structure of the present disclosure includes a baffle plate. A plurality of lap strips are attached around outer edges of the baffle plate. An adhesive layer is applied to outer surfaces of the lap strips. A plurality of sidewalls are assembled together around the adhesive layer, the lap strips and the baffle plate, thereby forming the beam structure. In an embodiment, the beam structure may be used as a boom assembly for a machine, such as an excavator machine.

13 Claims, 5 Drawing Sheets

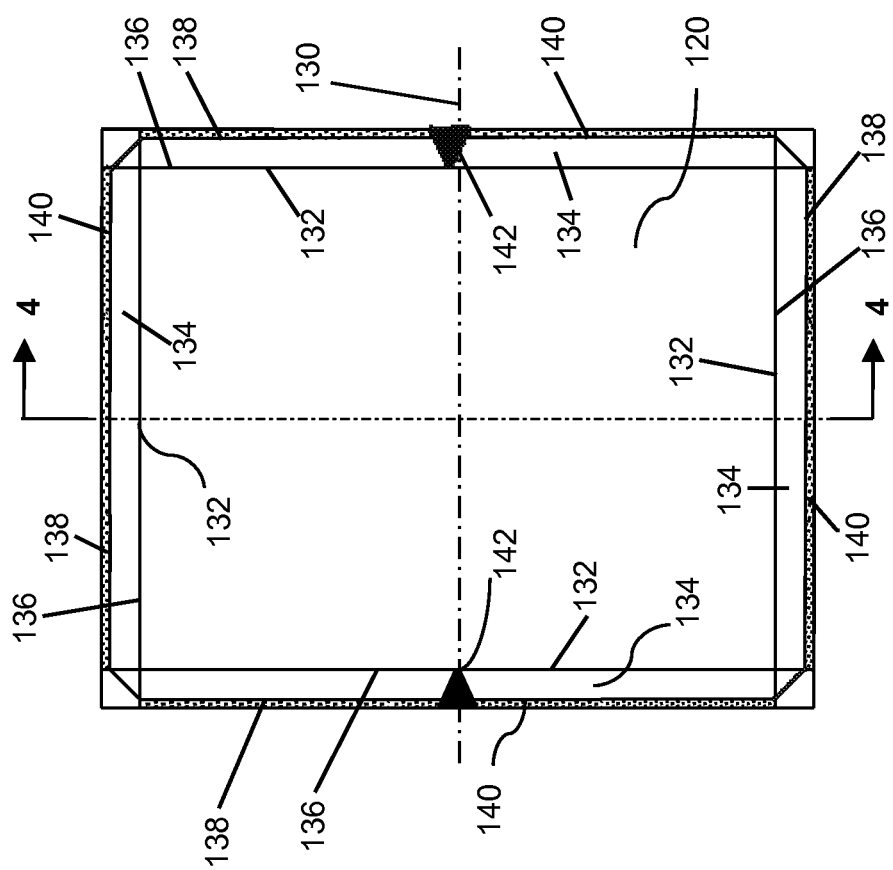

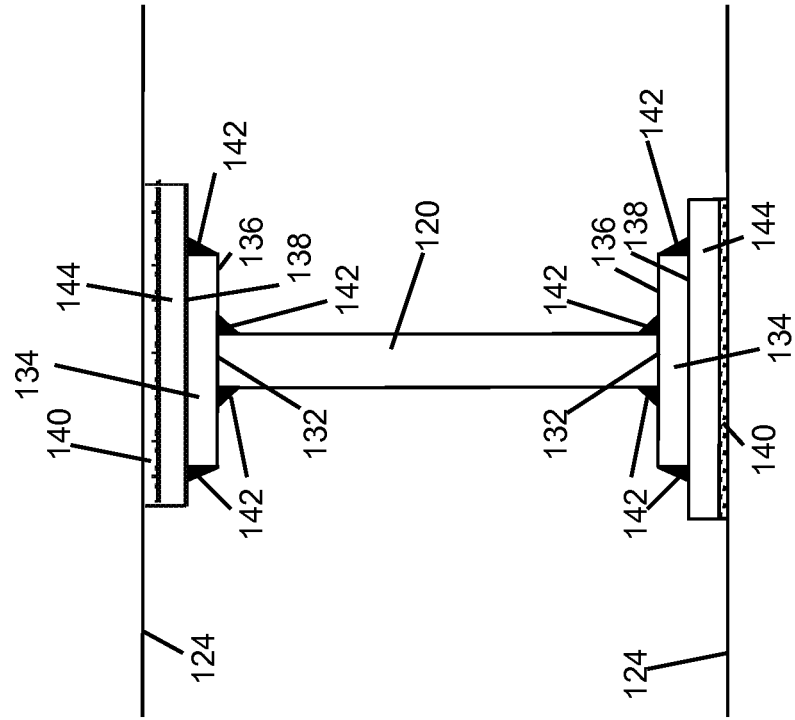
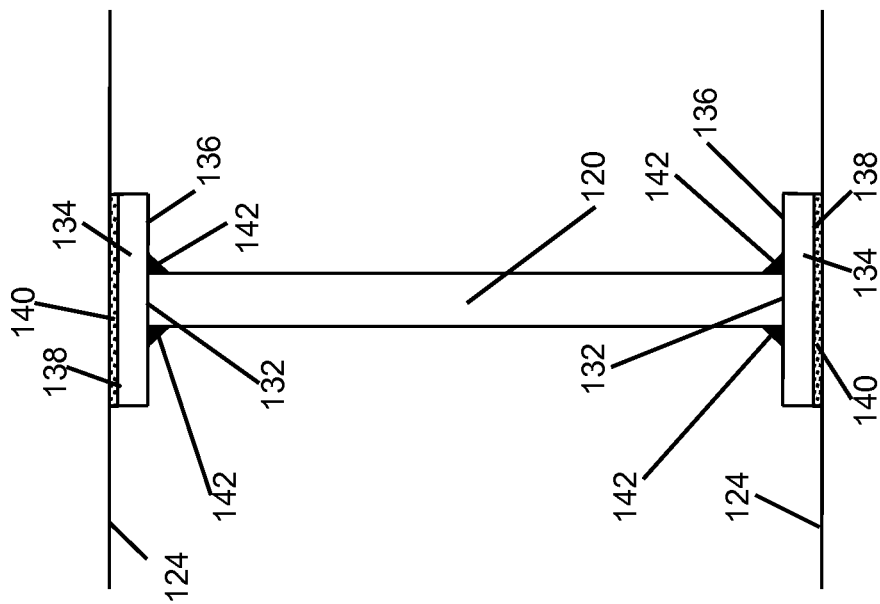
FIG. 4b
FIG. 4a

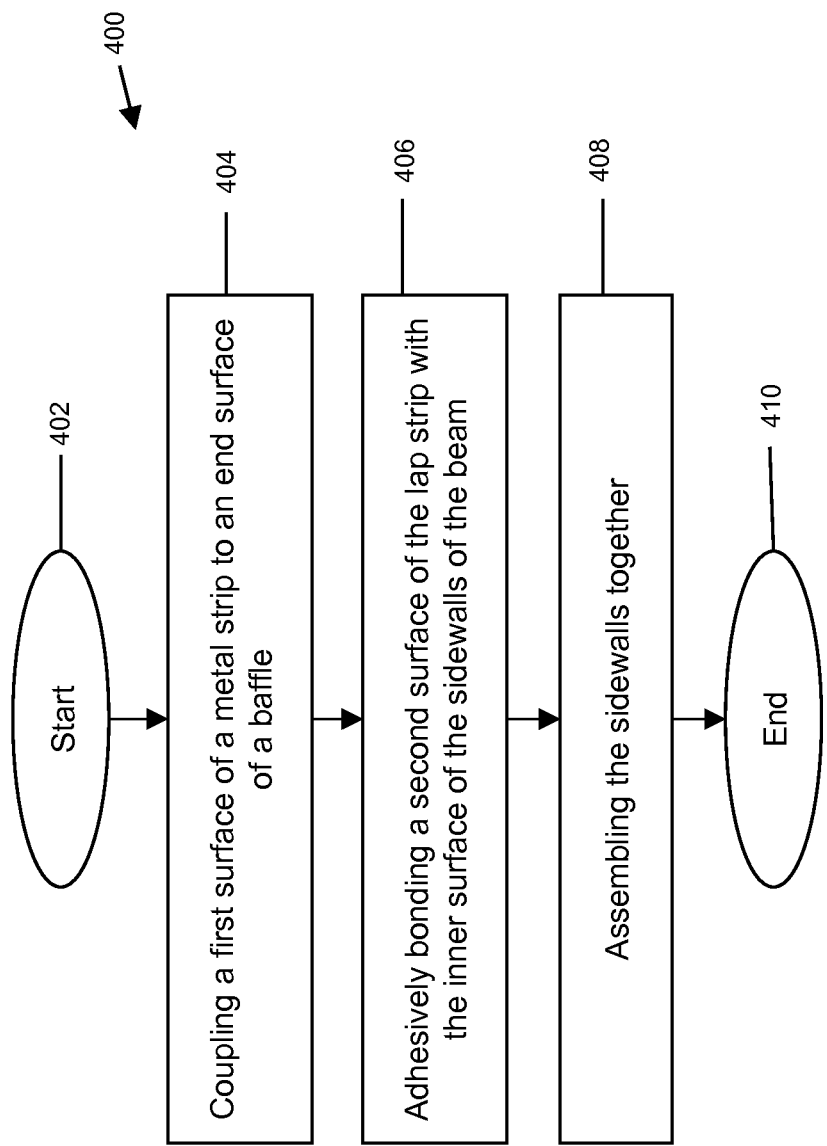

BEAM STRUCTURE

TECHNICAL FIELD

The present disclosure relates generally to a beam structure for a machine, such as an excavator. Specifically, the present disclosure relates to an easily manufactured beam that improves fatigue strength of the beam by reducing stress concentrators related to welding of baffles (cross members) inside the beam.

BACKGROUND

A construction machine, such as an excavator, may have a movable beam (boom) configured to dig or otherwise move earthen materials. The beam of the machine is generally formed as an elongated hollow tube using a number of rigid sidewall parts or plates assembled together. Reinforcing cross members known as baffles may be present inside the hollow tube beam. These reinforcing cross members are traditionally attached inside the beam by welding prior to the final assembly of the beam. Generally, the welding is performed manually. Because the reinforcing members may be located at hard to reach positions within the beam, the welding operation is difficult, time consuming, and costly. In addition, the location of the reinforcing members, may make it difficult to ensure the quality of the weld joint.

Because the reinforcing members are attached at high stress areas and intensive longitudinal and torsion loads are applied to the beam during use, these loads create high stresses that result in fatigue cracks at the weld joints. Furthermore, cracks initiated at the weld joint may propagate through the beam's sidewalls or plates, which may lead to premature beam failure.

Thus, in light of these and other shortcomings in the art, there is a need for improved beam structures.

SUMMARY

An embodiment of the present disclosure provides a beam structure. The beam structure includes a baffle plate. A plurality of lap strips are attached around outer edges of the baffle plate. An adhesive layer is applied to outer surfaces of the lap strips. A plurality of sidewalls are assembled together around the adhesive layer, the lap strips and the baffle plate, thereby forming the beam structure.

Another embodiment of the present disclosure provides a boom assembly. The boom assembly includes a beam. The beam has a baffle plate with a plurality of lap strips attached around outer edges of the baffle plate. An adhesive layer is applied to outer surfaces of the lap strips. A plurality of sidewalls are assembled together around the adhesive layer, the lap strips and the baffle plate. A stick is pivotably attached to an end of the beam and a first hydraulic cylinder is coupled between the beam and the stick. The hydraulic cylinder is configured to pivot the stick with respect to the end of the beam.

Yet another embodiment of the present disclosure provides a machine. The machine includes an undercarriage and a frame pivotably connected to the undercarriage. The frame includes a power system and an operator station. A boom assembly is pivotably connected to the frame. The boom assembly includes a beam. The beam has a baffle plate with a plurality of lap strips attached around outer edges of the baffle plate. An adhesive layer is applied to outer surfaces of the lap strips. A plurality of sidewalls are assembled together around the adhesive layer, the lap strips and the baffle plate. A stick is pivotably attached to an end of the beam and a first hydraulic cylinder is coupled between the beam and the stick. The hydraulic cylinder is configured to pivot the stick with respect to the end of the beam.

BRIEF DESCRIPTION OF DRAWINGS

FIG. 3 illustrates a cross-sectional view of an embodiment of the beam of FIG. 2 along line 3-3 showing an embodiment of the baffle according to the present disclosure.

FIG. 4a illustrates a cross-sectional view of an embodiment of the baffle of FIG. 3 along line 4-4.

FIG. 4b illustrates a cross-sectional view of another embodiment of the baffle of FIG. 3 along line 4-4.

FIG. 5 illustrates a flow chart of an embodiment of a method for forming a beam according to the present disclosure.

DETAILED DESCRIPTION

The present disclosure relates generally to a beam structure for a machine, such as an excavator. Specifically, the present disclosure relates to an easily manufactured beam that improves fatigue strength of the beam by reducing stress concentrators related to welding of baffles (e.g., cross members) inside the beam and a method of making such beam. While the present disclosure is described herein with respect to an excavator machine, those having ordinary skill in the art should readily understand that the beam of the present disclosure may have wide ranging uses, both on and off of mobile machines.

Figure 1:
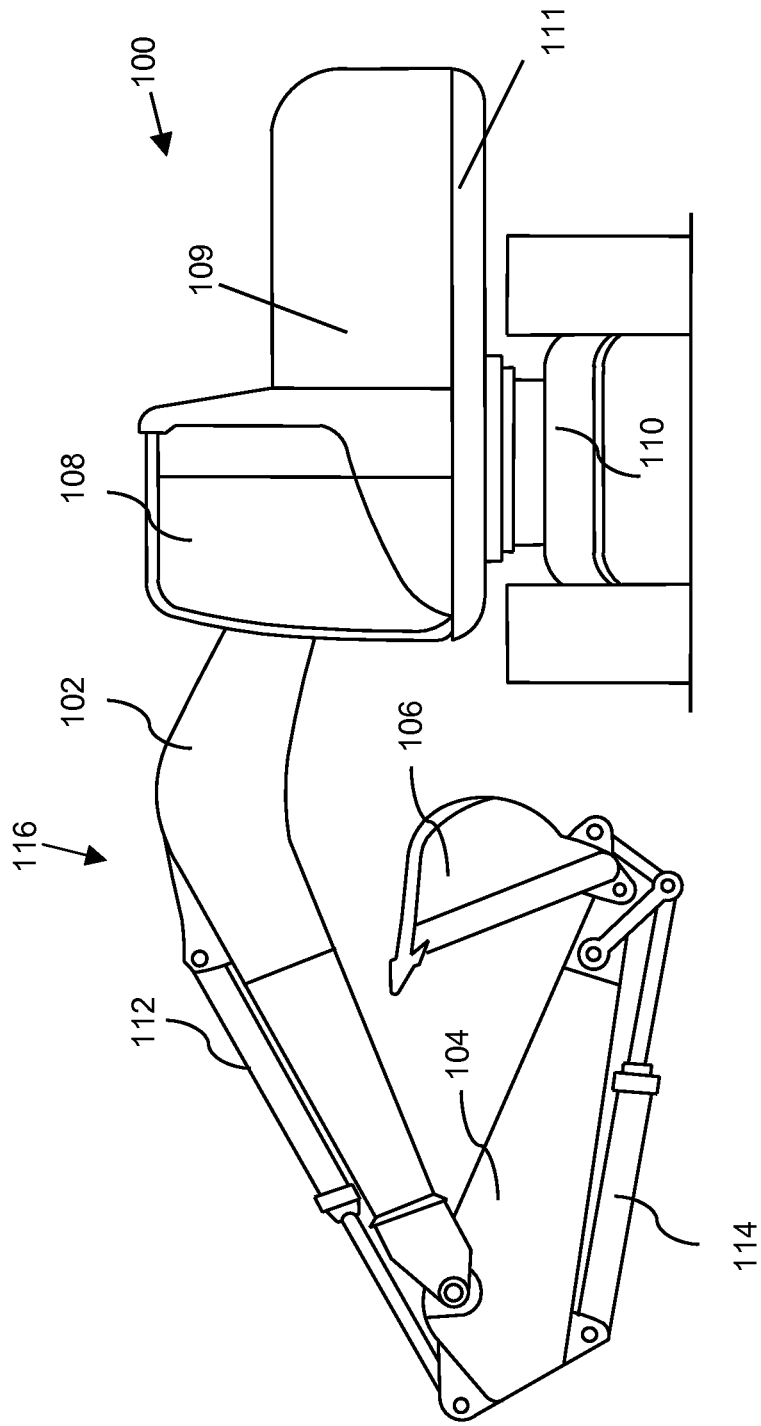
FIG. 1 illustrates a side view of a machine having a beam according to an embodiment of the present disclosure.

FIG. 1 illustrates a side view of a machine 100 having a beam 102 according to an embodiment of the present disclosure. The machine 100 includes a beam 102, a stick 104, a work tool, such as a bucket 106, an operator station 108, and an undercarriage 110. The beam 102 is pivotally coupled to the machine 100 at one end. Further, the beam 102 is configured to pivot in an upward and a downward direction with respect to the operator station 108. Furthermore, the beam 102 is pivotally coupled with the stick 104 at its other end. The stick 104 is configured to pivot back and fourth with respect to the beam 102. The stick 104 pivots with respect to the beam 102, by an actuating hydraulic cylinder 112. The bucket 106 is pivotally coupled to an opposite end of the stick 104. The bucket 106 pivots back and fourth with respect to the stick 104 when hydraulic cylinder 114, coupled between the bucket 106 and the stick 104, is extended or retracted. The beam 102, stick 104, bucket 106, and hydraulic cylinders 112 and 114 make-up a boom assembly 116.

The operator station 108 is configured to allow an operator access to controls for operating the machine 100. Further, the operator station 108 is located on a machine frame 111, which is rotatably coupled with the undercarriage 110 such that the operator station 108 can rotate in a clockwise or a counter-clockwise direction with respect to the undercarriage 110. A power system 109, such as an engine, a cooling system, and/or a hydraulic system is also located on the frame 111 and provides operating power for the propulsion and operation of the machine 100 as should be readily understood by those having ordinary skill in the art.

Figure 2:
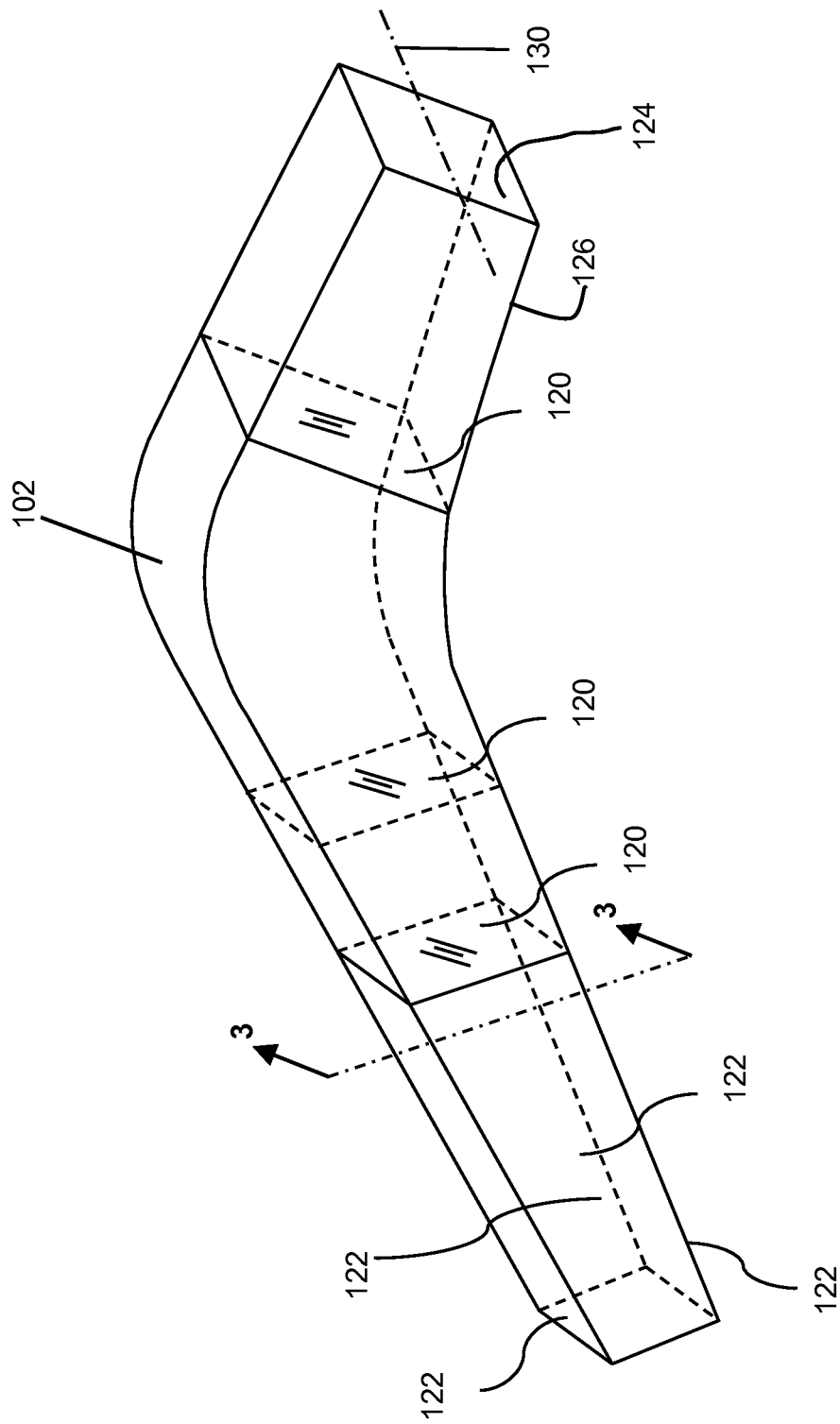
FIG. 2 illustrates a perspective view of a portion of the beam for the machine of FIG. 1 having a baffle according to the present disclosure.

FIG. 2 illustrates a perspective view of an embodiment of a portion of the beam 102 for the machine 100. The beam 102 includes one or more baffles 120 according to the present disclosure. The beam 102 comprises a number of sidewalls 122 and is formed by assembling the sidewalls 122 together in the desired shape and then welding at the intersections of the sidewalls 122 to form a rigid beam 102. In the embodiment shown, the beam 102 has four sidewalls 122 and forms a rectangular or square cross-section. In other words, sidewalls 122 form a cuboid or hollow square beam with four outer walls 122, each having an inner surface 124 and an outer surface 126. However, in other embodiments other numbers of sidewalls 122 may form the beam 102. For example, an embodiment of the beam 102 may have a trapezoidal cross section or any suitable geometric shape.

As shown in FIG. 2, the beam 102 has one or more baffles 120 located inside the sidewalls 122. The baffle(s) 120 provide(s) reinforcement to increase the rigidity and strengthen the beam 102.

FIG. 3 illustrates a cross-sectional view of an embodiment of the beam 102 along line 3-3 in FIG. 2 showing an embodiment of a baffle 120 according to the present disclosure. FIG. 4a illustrates a cross-sectional view of an embodiment of the baffle 120 along line 4-4 of FIG. 3. The baffle 120 is attached inside sidewalls 122 of the beam 102 to provide rigidity to the beam 102. End surfaces 132 of the baffle 120 are attached to the inner surface 124 of the sidewalls 122 using a plurality of lap strips 134. The lap strips 134 may be formed of steel and are layered between the end/edge surfaces 132 of the baffle 120 and the inner surface 124 of the sidewalls 122 of the beam 102. In an embodiment, the baffle 120 is a baffle plate having four end surfaces 132. In an embodiment, the baffle 120 is a one-piece member casted from suitable rigid material such as iron, steel, or other material. In an alternative embodiment, the baffle plate 120 is formed by stamping, machining, or other forming process. Other materials and methods of forming may be used for the lap strips 134, the baffle 120, and/or the sidewalls 122.

The lap strips 134 have a first surface 136 and a second surface 138. In an embodiment, the first surface 136 is coupled with the end surfaces 132 of the baffle 120 by welding. In another embodiment, the first surface 136 may be adhesively bonded with the end surfaces 132. The second surface 138 of the lap strip 134 is adhesively bonded with the inner surface 124 of a sidewall 122 of the beam 102 by an adhesive layer 140.

In addition, the lap strip 134 may also be welded (shown at 142) with the inner surface 124 of the sidewall 122 of the beam 102. It is to be noted that the lap strip 134 is welded to prevent relative motion between the lap strip 134 and the inner surface 124, until the adhesive 140 is cured. In an embodiment, the welds 142 are located in low stress/non fatigue critical areas determined by expected service loading conditions of the beam 102, such as along a neutral axis 130 of the beam 102. In an alternate embodiment, advanced adhesives are used, which may not require long curing times and thus, the welds 142 may be omitted. FIG. 4a also shows other locations where welds may be used.

In another embodiment, an additional lap strip 144 similar to lap strip 134 can be placed between the lap strip 134 and the inner surface 124 of sidewall 122 of the beam 102. FIG. 4b illustrates a cross-sectional view of another embodiment of the baffle 120 along line 4-4 of FIG. 3. It should be understood that any number of lap strips can be used for coupling the baffle 120 to the sidewalls 122 of the beam 102. In addition it should be understood that the lap strips 134 and 144 may be formed of materials other than metal, if desired. In another embodiment, the baffle 120 is coupled inside the sidewalls 122 by coupling the end surfaces 132 of the baffle 120 with the sidewall 122 of the beam 102 without the use of lap strips. The coupling of the end surfaces 132 is facilitated by adhesively bonding the end surfaces 132 with the inner surface 124 of the sidewall 122. FIG. 4b also shows other locations where welds may be used.

The choice of adhesive 140 may be determined by the design and loading requirements of the beam 102 structure. For Example, the adhesive 140 should have sufficient tensile strength, shear strength, and torsional strength to withstand maximum loading per the design requirements for the beam 102. Similarly, the adhesive 140 should have sufficient fatigue strength to withstand a pre-determined fatigue loading and number of use cycles for the intended design life of the beam 102. Another consideration for the adhesive 140 is a useful temperature range for the adhesive 140. In other words, the adhesive 140 temperature range may be dependent upon anticipated environment conditions for the expected use. In one such embodiment, the adhesive 140 should be configured to withstand temperatures in the range of −60 to 160 Degrees F. However, other temperature ranges for the adhesive 140 may be used. Other considerations for the adhesive are that the adhesive may be moisture, grease, and/or oil resistant. In an embodiment, the adhesive 140 does not require a heating/baking process to cure. For example, the adhesive 140 may be an epoxy or comparable type adhesive that cures via chemical reaction. In an alternative embodiment, the adhesive 140 may cure via heating/baking. As such, the curing may be accomplished during a baking procedure for curing paint (not shown) applied to the beam 102.

FIG. 5 illustrates a flow chart of an embodiment of a method 400 for forming a beam 102 according to the present disclosure. The method 400 begins at block 402 and proceeds to block 404. At block 404 end surfaces 132 of the baffle 120 is coupled with the first surface 136 of the lap strip 134. The first surface 136 of the lap strip 134 can be coupled with the end surfaces 132 of the baffle 120 by welding. In another embodiment, the first surface 136 of the lap strip 134 can also be adhesively bonded with the end surfaces 132 of the baffle 120.

The method 400 then proceeds to block 406 where the second surface 138 of the lap strip 134 is adhesively bonded with the inner surface 124 of the sidewall 102. The second surface 138 of the lap strip 134 is attached to the inner surface 124 of the sidewall wall 122 by first applying the adhesive layer 140 on the lap strip 134 and/or the inner surface 124 of the sidewall 124. Thereafter, the second surface 138 of the lap strip 134 is pressed with the inner surface 124 of the sidewall 122 having the adhesive layer 140 therebetween.

In an embodiment of the method 400, the lap strip 134 may be welded with the inner surface 124 of the sidewall 122. The welds 142 may be formed substantially along the neutral axis 130 of the beam 102. The welds 142 secure the lap strip 134 with the sidewall 122 until the adhesive 140 is cured. Welding may or may not be desired based on the curing time of the adhesive 140. In an alternate embodiment adhesives that do not require curing may be used.

In another embodiment (as shown in FIG. 4b), the second surface 138 of the lap strip 134 can be coupled with another lap strip 144. Thereafter, the second lap strip 144 is adhesively bonded to the inner surface 124 of the sidewall 122. Also, it can be appreciated that any number of lap strips can be layered together for coupling the baffle 120 with the sidewalls 122 of the beam 102. In an embodiment, successive lap strip layers may be larger than previous layers. Such increased width of the lap strips helps to spread out forces along sidewalls 122 of the beam 116.

The method 400 then proceeds to block 408 where the sidewalls 122 are assembled together to form the beam 102. In other words, the sidewalls 122 are positioned together and welded together to form the beam 102. In an embodiment, the beam 102 may be heated in an oven to cure the adhesive 140. It should be noted that curing may be optional, depending on the type of adhesive used or the curing process of the adhesive 140. Thereafter, the method 400 ends at block 410.

INDUSTRIAL APPLICABILITY

The present disclosure relates generally to a beam structure for a machine, such as an excavator (e.g., machine 100). Specifically, the present disclosure relates to an easily manufactured beam that improves fatigue strength of the beam by reducing stress concentrators related to welding of baffles/cross members (e.g., 120) inside the beam.

In an embodiment, a beam of the present disclosure (e.g., 102) is formed by adding additional lap strips (e.g., 134 and/or 144) to outer edges of a baffle plate (e.g., 120) and adhering the lap strips and baffle inside the beam using an adhesive. In an embodiment, lap strips are welded to outer edges of a baffle plate using fillet welds on both sides of the baffle plate at the intersection with the lap strips. This can be welded outside of the beam at any convenient location. An adhesive is applied to outer surfaces of the lap strips. This baffle assembly is installed inside a partially assembled beam (e.g., pre-assembled sidewalls welded together). Then, the adhesive may be applied to any remaining lap strips, which didn't previously receive adhesive. Spot welds or plug welds may be applied to hold the baffle assembly in place during curing time for the adhesive. Conversely, fasteners, clamps, or other securing methods may be used to hold the baffle assembly in place during curing time for the adhesive. In an embodiment, the welds may be applied along a neutral axis/centerline of the beam. Any remaining sidewalls for the beam are then assembled together with the beam assembly and welded together around the baffle assembly. The beam may then be painted, heated (for curing the paint and/or adhesive), and installed on a machine.

The beam of the present disclosure (e.g., 102) provides an easy to manufacture structure with improved strength. In addition, the beam provides improved service performance as there is a more spread out distribution of stress along the contact surface area of the lap strip (e.g., 134, 144) and sidewall (e.g., 122) of the beam. Further, adhesively bonding the lap strips to the sidewalls reduces a need for welding the baffles into place inside the beam. Accordingly, this improves the overall rigidity of the beam since the adhesive bond provides high fatigue strength against compressive loading.

Further, the strength of the adhesively bonded joints can be changed by changing the width of the lap strips, the thickness of the baffle, and choice of adhesive. Also, the beam is easy to manufacture because the cross members are coupled inside the beam using an adhesive rather than welding in difficult to reach areas.

While the present disclosure is described herein with respect to an excavator machine, those having ordinary skill in the art should readily understand that the beam of the present disclosure may have wide ranging uses, both on and off of mobile machines.

In the foregoing specification, the disclosure and its benefits and advantages have been described with reference to specific embodiments. However, one of ordinary skill in the art would appreciate that various modifications and changes can be made without departing from the scope of the present disclosure, as set forth in the claims below. Accordingly, the specification and figures are to be regarded in an illustrative rather than a restrictive sense, and all such modifications are intended to be included within the scope of the present disclosure. The benefits, advantages, solutions to problems, and any element(s) that may cause any benefit, advantage or solution to occur or become more pronounced are not to be construed as critical, required or essential features or elements of any or all the claims. The disclosure is defined solely by the appended claims, including any amendments made during the pendency of this application, and all equivalents of those claims, as issued.

What is claimed is:

1. A boom assembly comprising:
   a beam, the beam including
      a baffle plate;
      a plurality of lap strips attached around outer edges of the baffle plate;
      an adhesive layer applied to outer surfaces of the lap strips; and
         a plurality of sidewalls assembled together around the adhesive layer, the lap strips, and the baffle plate;
   a stick pivotably attached to an end of the beam; and
   a first hydraulic cylinder coupled between the beam and the stick and configured to pivot the stick with respect to the end of the beam.

2. The boom assembly of claim 1, further comprising a work tool pivotably coupled to an end of the stick substantially opposite where the stick pivotably attaches to the beam.

3. The boom assembly of claim 2, wherein the work tool is a bucket configured to dig earth material.

4. The boom assembly of claim 2, further comprising a second hydraulic cylinder coupled between the stick and the work tool and configured to pivot the work tool with respect to the stick.

5. The boom assembly of claim 1, wherein the lap strips are welded to the baffle plate at an angle substantially perpendicular to the baffle plate.

6. The boom assembly of claim 1, wherein the baffle plate is substantially perpendicular to the plurality of the sidewalls.

7. The boom assembly of claim 1, wherein the baffle plate is located within the beam at a location of higher stress relative to stress located along a length of the beam.

8. A machine comprising:
   an undercarriage;
   a frame pivotably connected to the undercarriage, the frame including a power system and an operator station; and
   a boom assembly pivotably connected to the frame; the boom assembly including,
      a beam, the beam including
         a baffle plate;
         a plurality of lap strips attached around outer edges of the baffle plate;
         an adhesive layer applied to outer surfaces of the lap strips; and
            a plurality of sidewalls assembled together around the adhesive layer, the lap strips, and the baffle plate;
      a stick pivotably attached to an end of the beam; and
      a first hydraulic cylinder coupled between the beam and the stick and configured to pivot the stick with respect to the end of the beam.

9. The machine of claim 8, further comprising a work tool pivotably coupled to an end of the stick substantially opposite where the stick pivotably attaches to the beam and a second hydraulic cylinder coupled between the stick and the work tool, the second hydraulic cylinder configured to pivot the work tool with respect to the stick.

10. The machine of claim 8, wherein the work tool is a bucket configured to dig earthen material.

11. The machine of claim 8, wherein the lap strips are welded to the baffle plate at an angle that is substantially perpendicular to the baffle plate.

12. The machine of claim 8, wherein the sidewalls are welded together around the baffle plate.

13. The machine of claim 8, wherein the baffle plate is substantially perpendicular to the plurality of the sidewalls.

* * * * *